United States Patent
Crawford et al.

(10) Patent No.: US 7,040,281 B2
(45) Date of Patent: May 9, 2006

(54) METHOD OF INJECTING A GASEOUS FUEL INTO AN INTERNAL COMBUSTION ENGINE

(75) Inventors: John G. Crawford, Richmond (CA); Kenneth R. C. Mann, Vancouver (CA)

(73) Assignee: Westport Research Inc., Vancouver (CA)

( * ) Notice: Subject to any disclaimer, the term of this patent is extended or adjusted under 35 U.S.C. 154(b) by 0 days.

(21) Appl. No.: 10/979,700

(22) Filed: Nov. 2, 2004

(65) Prior Publication Data

US 2005/0279321 A1 Dec. 22, 2005

Related U.S. Application Data

(63) Continuation-in-part of application No. 10/414,850, filed on Apr. 16, 2003, now Pat. No. 6,854,438, which is a continuation-in-part of application No. PCT/EP01/12182, filed on Oct. 22, 2001.

(51) Int. Cl.
*F02B 3/02* (2006.01)
*F02B 9/06* (2006.01)

(52) U.S. Cl. .................. 123/299; 123/305; 123/276

(58) Field of Classification Search ............. 123/27 R, 123/27 GE, 260, 276, 279, 295, 299, 300, 123/304, 305, 434, 472, 478, 480, 525, 527, 123/145 A; 239/584
See application file for complete search history.

(56) References Cited

U.S. PATENT DOCUMENTS

| | | | |
|---|---|---|---|
| 3,703,886 A | 11/1972 | Witzky | |
| 4,627,405 A | 12/1986 | Imhof et al. | |
| 4,721,081 A | 1/1988 | Krauja et al. | |
| 4,787,349 A | 11/1988 | Hilger | |
| 5,067,467 A * | 11/1991 | Hill et al. | 123/525 |
| 5,146,881 A | 9/1992 | Pfefferle | |
| 5,261,366 A | 11/1993 | Regueiro | |
| 5,315,973 A * | 5/1994 | Hill et al. | 123/299 |
| 5,329,908 A | 7/1994 | Tarr et al. | |
| 6,076,493 A | 6/2000 | Miller et al. | |
| 6,082,332 A | 7/2000 | Hefler et al. | |
| 6,101,986 A * | 8/2000 | Brown et al. | 123/27 GE |
| 6,298,829 B1 * | 10/2001 | Welch et al. | 123/472 |
| 6,463,907 B1 * | 10/2002 | Hiltner | 123/27 R |

(Continued)

FOREIGN PATENT DOCUMENTS

DE 30 386 49 1/1984

(Continued)

*Primary Examiner*—Willis R. Wolfe, Jr.
(74) *Attorney, Agent, or Firm*—McAndrews, Held & Malloy, Ltd.

(57) ABSTRACT

A method of operating a gaseous-fueled internal combustion engine comprises selecting one of at least two predetermined operating modes as a function of engine load and engine speed. A first operating mode is selected when said engine is commanded to operate within a first region corresponding to a low load and low speed range, and a second operating mode is selected when said engine is commanded to operate within a second region distinct from said first region and corresponding to at least one of a greater load and a greater speed range compared to said first region. In the first operating mode, the gaseous fuel is introduced in a single injection event with the injection valve commanded to open with a constant amplitude A1. In the second operating mode, the gaseous fuel is introduced in a single injection event and the injection valve is commanded to begin with a constant amplitude A2 for a predetermined time and then to open to an amplitude A3, wherein amplitude A3 is greater than amplitude A2.

46 Claims, 8 Drawing Sheets

U.S. PATENT DOCUMENTS

| | | | |
|---|---|---|---|
| 6,516,774 B1 * | 2/2003 | zur Loye et al. | 123/299 |
| 6,637,675 B1 | 10/2003 | Carroll, III et al. | |
| 6,640,773 B1 | 11/2003 | Ancimer et al. | |
| 6,675,748 B1 * | 1/2004 | Ancimer et al. | 123/299 |
| 6,705,275 B1 * | 3/2004 | Fukuzumi | 123/305 |
| 6,854,438 B1 * | 2/2005 | Hilger et al. | 123/299 |
| 6,912,992 B1 * | 7/2005 | Ancimer et al. | 123/299 |
| 2003/0159441 A1 | 8/2003 | Kim et al. | |
| 2005/0199746 A1 * | 9/2005 | Bartunek et al. | 239/584 |
| 2005/0257769 A1 * | 11/2005 | Li et al. | 123/299 |

FOREIGN PATENT DOCUMENTS

| | | |
|---|---|---|
| DE | 36 314 73 | 11/1988 |
| DE | 42 439 64 | 6/1994 |
| DE | 100 52 336 | 10/2000 |
| EP | 0 371 759 | 6/1990 |
| EP | 0 916 830 | 5/1999 |
| JP | 09-159169 | 6/1995 |
| JP | 2000291495 | 10/2000 |

* cited by examiner

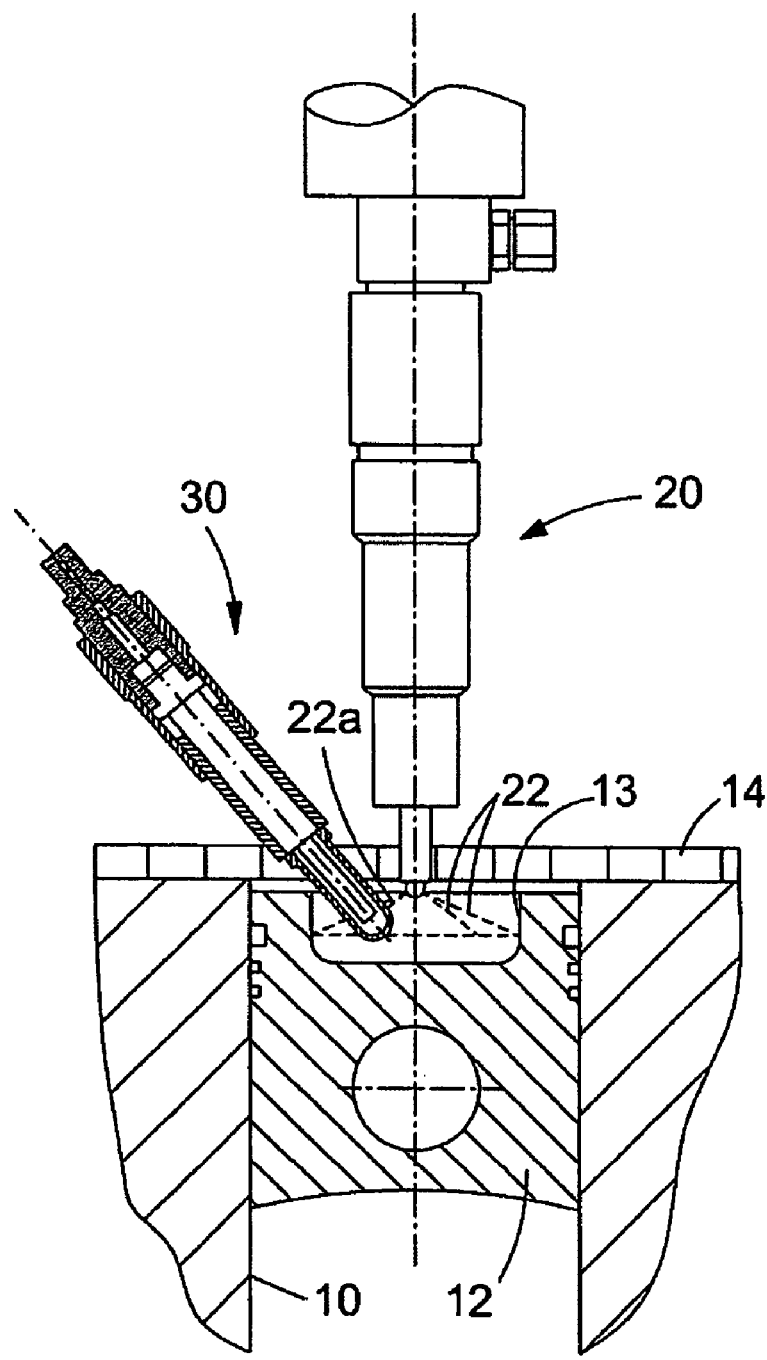
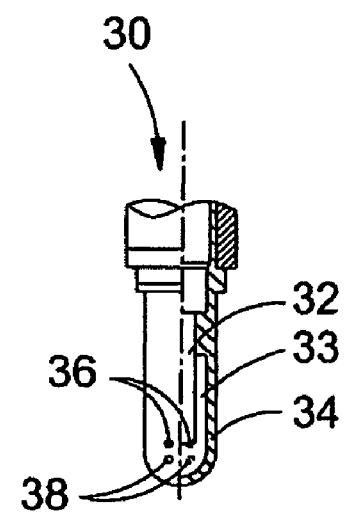
Fig. 1
Fig. 2

Fig. 3
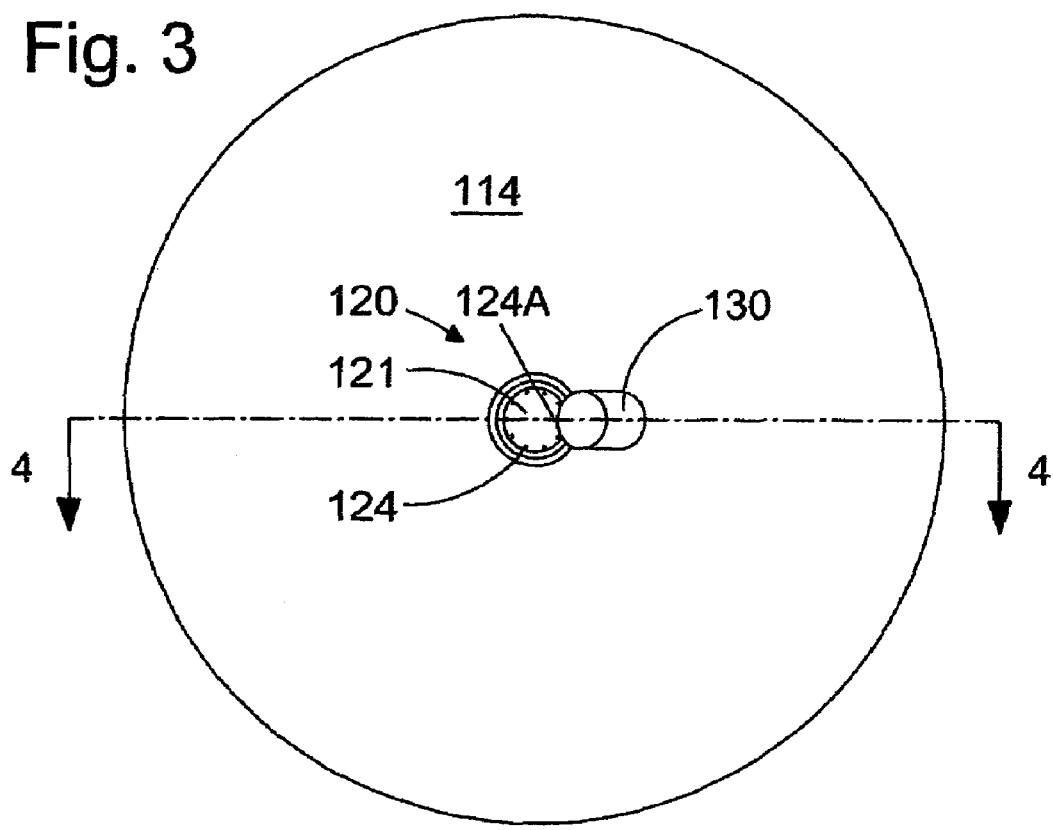
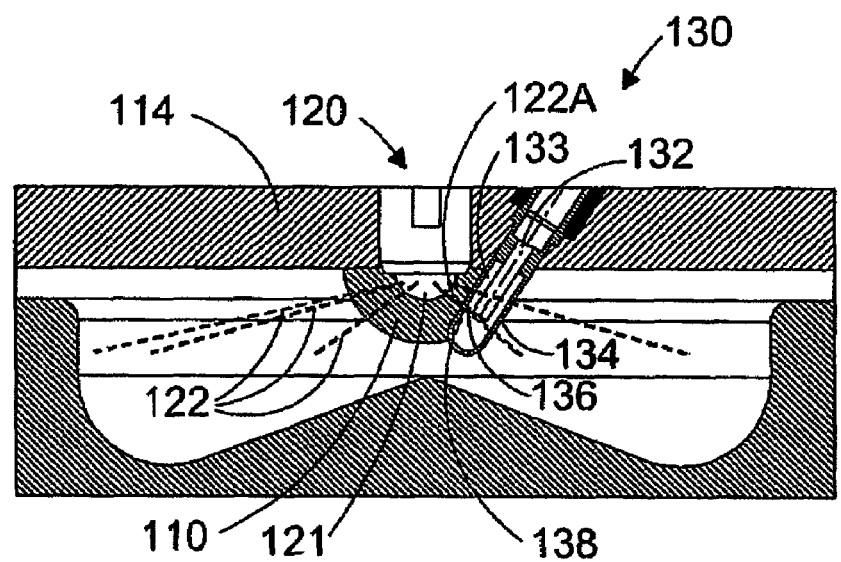
Fig. 4

METHOD OF INJECTING A GASEOUS FUEL INTO AN INTERNAL COMBUSTION ENGINE

CROSS-REFERENCE TO RELATED APPLICATION(S)

This application is a continuation-in-part of U.S. patent application Ser. No. 10/414,850, having a filing date of Apr. 16, 2003, entitled, "Internal Combustion Engine With Injection of Gaseous Fuel", U.S. Pat. No. 6,854,438, which is in turn a continuation-in-part of International Application No. PCT/EP01/12182, having an international filing date of Oct. 22, 2001, which bears the same title. International Application No. PCT/EP01/12182 claimed priority benefits, in turn, from German Patent Application No. 10052336.6 filed Oct. 22, 2002. U.S. Pat. No. 6,854,438, and International Application No. PCT/EP01/12182 are hereby incorporated by reference herein in their entirety.

TECHNICAL FIELD

The present invention relates to a method of injecting a gaseous fuel directly into a combustion chamber of an internal combustion engine. A gaseous fuel is defined herein as a fuel that is in the gaseous phase at atmospheric pressure and temperature. More particularly, the method relates to the selection of different gaseous fuel injection strategies for different predetermined operating modes whereby the timing, the quantity, and the mass flow rate of fuel being introduced into the combustion chamber are controlled as a function of engine speed and engine load.

BACKGROUND

Liquid-fueled internal combustion engines have been used to produce power and drive machines for over a century. From the beginning, internal combustion engines have undergone many improvements to become more efficient, more powerful, and/or less polluting. To assist with these improvements, fuel properties and quality have also improved, and alternative fuels such as methanol and other alcohol-based fuels have also been considered to help with reducing harmful emissions. However, compared to such liquid fuels, an equivalent amount of a combustible gaseous fuel, such as methane, propane, butane, hydrogen, natural gas, and blends of such fuels, with equivalence measured on an energy basis, can be combusted to produce the same power while producing less harmful emissions in the form of particulates and greenhouse gases.

However, a problem with replacing liquid fuel with some of these gaseous fuels in a conventional internal combustion engine has been that they typically do not ignite as readily or at the same rate as liquid fuels. There are also many other differences that result when a gaseous fuel is substituted for a liquid fuel. For example, the combustion strategy may be different to account for longer ignition delays associated with a gaseous fuel, or a longer time may be required to inject a gaseous fuel into the engine. In addition, the fuel supply system and the manner of introducing the fuel into the engine typically require equipment specialized for handling gaseous fuels. Furthermore, the selected combustion strategy can dictate a different geometry for the combustion chamber. Accordingly, a design suitable for a liquid-fueled engine may not be suitable for a gaseous-fueled engine without considerable modifications, which can influence commercial viability.

Gaseous-fueled engines currently used in commercial vehicles operate using the Otto cycle with homogeneous mixture formation, spark ignition, and throttle control, and these engines are predominantly derived from modified diesel-cycle engines, because of the durability, power and torque required for commercial vehicles. For example, the mixture forming process, modified from that of diesel-cycle engines, as well as the use of spark ignition, are aspects that require respective modifications of the intake system and the cylinder head. The modified combustion process also necessitates a modified combustion chamber recess in the piston. Engine manufacturers usually make efforts to keep the number of engine components to be modified for gaseous fuel operation as low as possible. This is an attempt to limit the additional manufacturing costs for adapting engines to use gaseous fuel, if possible, while maintaining the durability and long service life that operators of conventionally-fueled engines have become accustomed to for their commercial vehicles.

For gaseous-fueled internal combustion engines, one of the predominant combustion processes operates with stoichiometric fuel-air mixtures in combination with a three-way catalytic converter to reduce emissions. Initially demand for gaseous-fueled engines in commercial vehicles was based on the desire for low-emission characteristics, with efficiency and fuel consumption characteristics being secondary considerations. The admixture of gaseous fuel typically takes place through a gaseous fuel mixer, arranged in the center of the intake system, with electronically controlled gaseous fuel supply. More recent gaseous fuel systems have switched to multipoint injection in front of the intake valve of each cylinder, to improve equal distribution of the fuel and to maintain a stoichiometric mixture composition during non-stationary engine operation. In order to maintain the stoichiometric ($\lambda=1$) fuel-air mixture, a 'closed-loop' air/fuel ratio control known from gasoline engines can be employed. The compression ratio is generally limited to values between 11:1 and 11.5:1 to ensure a sufficient safety margin against knocking.

The performance that can be achieved by non-supercharged engines with stoichiometric control is at least 5% below that of naturally aspirated liquid-fueled diesel-cycle engines, caused by the decreased air volume drawn in by the engine, which results from the addition of the gaseous fuel into the intake pipe. Compared to today's supercharged liquid-fueled diesel-cycle engines, gaseous-fueled Otto cycle engines produce up to 15% less power, taking into account the effect of the higher thermal loads and the knock limit associated with Otto cycle engines. This loss in power already takes into account that the use of exhaust gas recirculation with EGR rates of up to 15% can reduce the thermal load. The practical way to compensate for the lower performance of Otto cycle engines is to increase the displacement.

The fuel economy of stoichiometrically-controlled gaseous-fueled engines is characterized by an energy consumption that is 15 to 20% higher in stationary 13 mode tests than that of comparable diesel engines. When operating frequently under low load, as is typical for buses operating in cities, the throttle control has been found to be responsible for an increase in fuel consumption of above 40%.

The disadvantages with respect to power and fuel economy of stoichiometrically-controlled gaseous-fueled engines, in comparison to today's liquid-fueled diesel cycle engines, can be significantly reduced by employing lean-mix engine concepts. Mixture formation usually takes place downstream of the turbo charger in an electronically controlled fuel-air mixer centrally located in the intake system. For compression ratios between 11:1 and 11.5:1, the lean-mix engine as a rule possesses a combustion chamber geometry similar to those of stoichiometrically-controlled engines. Since leaner natural gas fuel-air mixtures lead to a strongly decreasing rate of combustion, a suitable adjustment of, for example, the squish flow is necessary or desirable to counteract a prolonged combustion process with accordingly higher hydrocarbon emissions. Air ratios achievable by today's lean-mix engines are not greater than $\lambda=1.5$ for high engine loads, making higher rates of combustion possible. At low engine loads, the combustion temperature is lower and the ability to operate on a lean mixture is thus limited to $\lambda$ values between 1.1 and 1.3.

Since thermal stresses on components of lean-mix engines are lower than those in stoichiometrically-controlled gaseous fuel engines, it becomes possible to significantly increase the boost pressure, so that in combination with charge-air cooling one can achieve effective average pressures of up to 14 bar. The torque band to a large extent corresponds to that of a large number of commercially available liquid-fueled diesel-cycle engines. However, lean-mix engines can still suffer from significant power disadvantages in comparison to the power levels achieved by Euro 3 type liquid-fueled diesel cycle engines.

Since the ability to operate today's lean-mix engines on even leaner mixes is limited, especially in the lower partial load range, to $\lambda$ values of 1.2 to 1.4, due to the slow rate of combustion of natural gas compared to conventional liquid fuels, these engines also require throttle control. Accordingly, the ECE R49 emission test determines fuel consumption rates that are, depending on the engine design, more than 15% greater than those of comparable liquid-fueled diesel cycle engines. For example, during everyday operation of a city bus, this results in fuel consumption values that are up to 30% higher because of the large proportion of operating time when the engine operates under idle or low load conditions.

Lean-mix concepts for natural gas engines aimed at meeting the new Euro 4 emission standards coming into effect in 2005 are expected be characterized by further developments of existing lean-mix engine concepts aimed at broadening the limits of lean-mix operation to enable reduced NOx emission values below the limit of 3.5 g/kWh.

For this purpose, combustion processes are being developed that are characterized by a more intensive cylinder charging movement, to compensate for the strongly decreasing rate of combustion of very lean mixtures with a relative air/fuel ratio of up to 1.6 at operating conditions close to full load. Lean-mix engines of this type possess combustion processes with increased ability to run on lean mixtures and also are equipped with exhaust turbo-charging and charge-air cooling. Depending on the design, the compression ratio lies between 11.7:1 and 13:1. Such designs should be able to achieve NOx values in the ECE R49 emission test of between 1.5 and 2 g/kWh, given hydrocarbon values upstream of the catalytic converter of approximately 2.9 g/kWh.

Due to the higher compression ratio and the lean mixture under full load, maximum engine efficiency can be increased up to a value of 40%. Consequently, in an ECE R49 test cycle, the fuel consumption values should only be 5% to 15% higher than those of future liquid-fueled diesel cycle engine designs for the Euro 4 emission standard. Depending on the design of the turbo charger, the achievable mean pressure can reach a maximum effective mean pressure of 14 bar to 18 bar.

In addition to developments in the area of homogeneous lean-mixture processes, recent efforts have been directed to processes with high-pressure gaseous fuel injection directly into the combustion chamber of an unthrottled engine. Such engines can employ a compression ratio similar to those employed in liquid-fueled diesel cycle engines because knocking is not a problem. For example with this type of engine, a compression ratio of between 16:1 and 18:1 can be employed. An advantage of this approach is that the low emission levels achievable with a gaseous-fueled engine can be combined with the significantly higher efficiency levels normally only associated with liquid-fueled diesel-cycle engines.

U.S. Pat. No. 5,329,908 discloses a compressed natural gas injection system for gaseous-fueled engines. The fuel injection nozzle is operated so that during the injection process the gaseous fuel spreads as a cloud into the combustion chamber recess through an annular discharge opening being formed during the injection process. During this process, part of the cloud comes into contact with an ignition plug and the fuel-air mixture within the combustion chamber is ignited at the ignition plug. One of the described embodiments uses a constant pressure gas supply and a conventional glow plug serves as the ignition plug. A fuel supply unit is described for ensuring that the gaseous fuel can be supplied to the fuel injection valves with a pressure that is high enough to introduce the fuel into the combustion chamber when the piston is near top dead center. This engine operates in a high efficiency mode that achieves efficiencies like those of a liquid-fueled diesel-cycle engine. However, conventional glow plugs like those used in diesel engines are designed to provide ignition assistance only during start-up because diesel fuel readily auto-ignites at the pressures and temperatures normally present in a diesel engine once it is running. Since gaseous fuels like natural gas do not auto-ignite as readily as diesel, an ignition plug may be needed in the present arrangement to continuously provide ignition assistance to initiate combustion. Continuous activation of a conventional glow plug, which is only designed for brief use during start up, can lead to early failure. Experiments have shown that the length of a glow plug's service life generally decreases as operating temperature increases, and that conventional glow plugs can not be relied upon to provide the durability for continuous activation at the temperatures that operators of gaseous-fueled internal combustion engines are expected to demand.

U.S. Pat. No. 4,721,081 is directed to a glow plug shield with thermal barrier coating and ignition catalyst, which purports to extend the service life of a glow plug that is used to ignite fuels that are not auto-ignitable. In the background discussion provided by the '081 patent, it is noted that it is known to provide protective tubular shields of metal or ceramic circumferentially surrounding a glow plug along its length. The '081 patent further states that it is also known to protect a silicon nitride glow plug by coating the plug with a refractory metal oxide and to provide the glow plug with a combustion promoting catalyst so that the glow plug temperature can be reduced. The improvements added by the '081 patent includes a shield that has an oblique open end that exposes the glow plug in the direction of the fuel injector, while providing a solid physical barrier in the direction of the intake valves. The '081 patent further discloses coating the interior and exterior of the shield with a ceramic refractory material, such as a metal oxide that acts as a thermal barrier so that the shield reduces the cooling effect of the inlet gas on the glow plug and also reduces the electrical power needed by the glow plug to maintain a surface temperature suitable for sustaining good combustion. According to the '081 patent, to further reduce the required glow plug temperature and extend glow plug life, a combustion catalyst can be incorporated into the coating.

There is a need for a gaseous-fueled internal combustion engine that can match the performance, efficiency, reliability, and durability of an equivalent liquid-fueled diesel-cycle engine, while producing lower amounts of harmful emissions such as particulate matter and nitrogen oxides. Such an engine can play a major role in the improvement of air quality, especially in highly populated areas where presently there is concentrated use of liquid-fueled diesel-cycles engines and where gaseous fuels such as natural gas can be easily distributed.

SUMMARY

A method is provided for injecting gaseous fuel into the combustion chamber of an unthrottled high compression engine. For example, in an engine with a compression ratio of between 16:1 and 18:1, the gaseous fuel can be injected at a high pressure of between 200 and 300 bar, with fuel injection beginning near the end of the compression stroke. Higher compression ratios are also possible. The duration of the fuel injection event can be such that fuel continues to be injected during the beginning of the power stroke. It is desirable for the injection event to be continuing after the start of combustion. The method results in the formation of an inhomogeneous fuel-air mixture, similar to that found in a diesel engine. To practice this method, a high-speed gaseous fuel injection valve is desirable, the injection valve being controllable to allow intermediate mass flow rates between zero and maximum flow and that can be operated to modulate between different flow rates during the course of an injection event. Such an injection valve is employed to inject the gaseous fuel into the combustion chamber so that the shape of the commanded fuel injection pulse can be manipulated. The combustion chamber is defined by a cylinder, a piston that is reciprocable within the cylinder, and a cylinder head covering one end of the cylinder. A piston rod connects the piston to a crankshaft whereby the crankshaft is rotatable by reciprocal movement of the piston. The combustion chamber can be further defined in part by a piston bowl or recess formed in the piston head (which is the end surface of the piston that faces the combustion chamber). Using the present method and operating with a compression ratio substantially the same as that of an equivalent diesel engine, it is possible to reduce the modifications required for natural gas operation and to reduce manufacturing costs, by shaping the combustion chamber so that it corresponds largely to the geometry of combustion chambers found in conventional diesel engines.

Due to the insufficient ability of gaseous fuels such as natural gas to reliably self-ignite in an internal combustion engine, in embodiments of the method ignition of the fuel-air mixture is ensured by employing an ignition device that includes an igniter that is heatable by an electrical heating element. More specifically, the method further comprises:

selecting one of at least two predetermined operating modes as a function of engine load and engine speed, wherein a first operating mode is selected when the engine is commanded to operate within a first region corresponding to a low load and low speed range, and a second operating mode is selected when the engine is commanded to operate within a second region distinct from the first region, the second region corresponding to at least one of a greater load range and a greater speed range compared to the first region;

in the first operating mode, introducing the gaseous fuel in a single injection event for each combustion cycle and commanding the injection valve to open with a constant amplitude A1; and in the second operating mode, introducing the gaseous fuel in a single injection event for each combustion cycle and commanding the injection valve to begin with a constant amplitude A2 for a predetermined time and then commanding the injection valve to open to an amplitude A3, wherein amplitude A3 is greater than amplitude A2.

The method can further comprise selecting a third operating mode when the engine is commanded to operate within a third region distinct from the second region. The third region corresponds to at least one of a greater load range and a greater speed range compared to the second region. In the third operating mode, the gaseous fuel is introduced in two separate injection events, and the injection valve is commanded to open to an amplitude A4 for a first injection event and an amplitude A5 for a second injection event.

When the first operating mode is selected, the duration for the injection event has an effect on emissions such as carbon monoxide and NOx, as well as other operating characteristics such as combustion stability and thermodynamic efficiency. A duration for the injection event of between about 3 and about 5 milliseconds has been found to be effective when the first operating mode is selected. It is believed that a diffusion combustion mode, encouraged by an injection duration that continues significantly beyond start of ignition can achieve more desirable combustion characteristics compared to a pre-mixed combustion mode which occurs when the duration of the injection event is relatively short. In the first region, for the first operating mode, a duration for the injection events of about 5 milliseconds can be employed when the engine is operating at or near idle and changes in the duration of the injection event can be made as a function of engine speed, with the duration of the injection event decreasing and amplitude increasing as engine speed increases from idle.

When the second operating mode is selected and the engine is operating under steady state conditions, the method can comprise reducing emissions of hydrocarbons and NOx by limiting boost pressure in an air intake system for the engine to less than 120 kPag, and more preferably to less than 65 kPag.

The Japanese G13 emissions certification test requires engine emissions testing at 13 engine operating conditions, with each condition called a mode. "Mode 6" of this test corresponds to when the engine is operating within the second operating mode of the present method, with the engine operating with a torque that is 40% of maximum engine torque deliverable when the engine speed is 60% of the speed at which the engine produces maximum power. Experimental data collected at Mode 6 shows that at this operating condition, boost pressure can be limited in an air intake system for supplying air to the combustion chamber of the engine, so that air-fuel ratio ($\lambda$) is less than 2.7.

When the third operating mode is selected and the engine is operating under steady state conditions, the method can further comprise commanding a boost pressure in an air intake system for the engine of between about 100 and about 120 kPag and more preferably about 100 kPag. For the engine from which these boost pressures were tested, in the third operating mode these pressures generally correspond to commanding a λ that is between about 1.4 and about 1.5 and more preferably about 1.5.

When one of the first or second operating modes is selected, the method can further comprise controlling at least one of injection timing and commanded amplitude to introduce a predetermined quantity of fuel as determined by reference to an engine map and end the injection event after start of combustion. The method can further comprise controlling the timing for starting the injection event as a function of engine speed and increasing the number of crank angle degrees before top dead center for timing the start of the injection event as engine speed increases.

When the third operating mode is selected, the method further comprises controlling at least one of injection timing and commanded amplitude to introduce a predetermined quantity of fuel as determined by reference to an engine map and end the second injection event after start of combustion. The method can further comprise controlling the timing for starting the first injection event as a function of engine speed and increasing the number of crank angle degrees before top dead center for timing the start of the first injection event as engine speed increases.

In the relevant engine operating modes, for each combustion cycle, the method preferably comprises introducing the majority of the gaseous fuel into the combustion chamber after start of combustion.

An internal combustion engine fueled with a combustible gaseous fuel is provided for practicing the present method. The engine comprises:

- at least one combustion chamber defined by a cylinder, a piston reciprocable within the cylinder, and a cylinder head that covers an end of the cylinder;
- an ignition device with an end disposed within the combustion chamber, the ignition device comprising an igniter that is heatable to provide a hot surface and a sleeve surrounding the igniter, the sleeve defining a shielded space between the igniter and the sleeve;
- a fuel injection valve disposed within the combustion chamber, the fuel injection valve being operable to introduce the combustible gaseous fuel into the combustion chamber with a plurality of fuel sprays each spray of which is released from one of a plurality of fuel injection ports, wherein one of the plurality of fuel injection ports is oriented to direct a fuel spray, referred to as an ignition fuel spray, towards an impingement point on a surface of the sleeve so that when the ignition fuel spray exits its respective fuel injection port a substantial portion of the ignition fuel spray is flowing in a spray direction that is oriented less than or equal to 25 degrees from an axis perpendicular to a plane that is tangential to the sleeve at the impingement point;
- at least two intake openings provided through the sleeve, each opening having a center spaced between 1 and 1.5 millimeters from the impingement point, the intake openings connecting the shielded space to the combustion chamber whereby, when the ignition fuel spray impacts the impingement point, a portion of the combustible gaseous fuel contained within the ignition fuel spray passes through the intake openings and into the shielded space;
- a discharge opening provided through the sleeve, wherein the discharge opening is oriented to direct a burning fuel-air mixture from the shielded space and towards the plurality of fuel sprays near the fuel injection valve; and
- wherein the sleeve restricts flow between the shielded space and the combustion chamber so that combustion of the combustible gaseous fuel within the shielded space produces a pressure therein that is greater than the pressure within the combustion chamber and the pressure is high enough to propel the burning fuel-air mixture into the combustion chamber and into contact with the plurality of fuel sprays.

Experiments have shown that the present engine design, which combines an ignition device with an ignition spray of short free length, and a high compression ratio typical of self-igniting internal combustion engines (diesel engines), enables operationally dependable, reliable and low-emission operation of an internal combustion engine. Furthermore, in comparison to known configurations, an ignition device that comprises a sleeve disposed around an igniter to provide a shielded space next to the igniter can be employed to significantly reduce the heating power to be supplied to the igniter. In addition, the experimental data shows that selecting different gaseous fuel injection strategies for different predetermined operating modes can yield better overall engine operating characteristics, compared to using the same injection strategy for the relevant operating conditions in all engine operating regions. Furthermore, with the injection strategy applied to each operating mode, improvements can be made to reduce emissions and increase thermodynamic efficiency and combustion stability by controlling injection parameters and conditions inside the combustion chamber, including the timing for starting and ending the injection events, the commanded amplitude for the fuel injection valve during the injection event, and boost pressure.

The igniter is heated, such as, by way of example, an electrically heated glow plug. However, unlike conventional glow plugs, the glow plug for practicing the present method should be designed for continuous operation under the operating conditions associated with the present engine. The igniter and/or the sleeve can comprise a ceramic surface. Furthermore, a combustion catalyst can be deposited on the igniter or sleeve to lower the operating temperature for stable combustion.

BRIEF DESCRIPTION OF THE DRAWINGS

The method can be better understood with reference to the figures, which illustrate a preferred apparatus for implementing the present method in addition to figures that illustrate the method and experimental data that show its advantages.

FIG. 1 is a side view of the gaseous fuel injection nozzle and ignition device disposed within the combustion chamber;

FIG. 2 is an enlarged and more detailed view of the side of an ignition device that can be oriented with the depicted hole openings facing the injection valve from which the ignition spray originates. A section view is shown on the right side of the centerline to better show the position of the igniter inside the sleeve;

FIG. 3 is a plan view of the cylinder head viewed from the bottom of the combustion chamber as if the piston were removed, showing the position of the fuel injection valve relative to the ignition device;

FIG. 4 is a partial section view indicated by a section line shown in FIG. 3. The partial section of FIG. 4 shows the centerlines of fuel sprays indicating injection angles for directing fuel sprays towards the ignition device and into the combustion chamber.

DETAILED DESCRIPTION

Figure 4A:
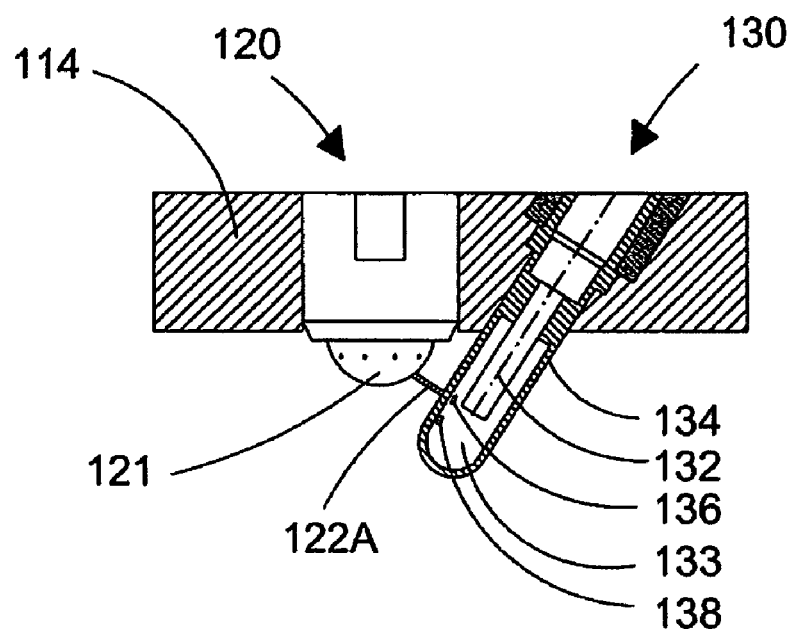
FIG. 4A is an enlarged view of the fuel injection valve nozzle and ignition device, showing a clearer view of the ignition fuel spray in the absence of the other fuel sprays.

FIG. 1 is a partial cross-section of a gaseous-fueled internal combustion engine illustrating an example of a combustion chamber that can be used to practice the present method. The illustrated combustion chamber is defined by cylinder 10, piston 12, which is reciprocable within cylinder 10, and cylinder head 14, which covers the top end of cylinder 10. Fuel injection valve 20 and ignition device 30 are mounted in cylinder head 14 with respective tips that extend into the combustion chamber. This internal combustion engine can be of an inline or V-design with various desired numbers of cylinders and displacement.

Piston 12 can be substantially the same as the piston employed in an equivalent diesel-fueled engine, and typically includes chamber recess 13. A simple shape for chamber recess 13 is shown for illustrative purposes, but persons skilled in the technology will understand that other shapes can be employed. For example, as shown in FIG. 4, smaller engines can use a combustion chamber with a pip to promote turbulence for improved mixing. The rapid formation of a fuel-air mixture within the combustion chamber can also be supported by turbulence and swirl within the cylinder charge during a fuel injection event.

The tip of fuel injection valve 20 includes a gaseous fuel injection nozzle with a plurality of fuel injection ports through which gaseous fuel is introduced directly into the combustion chamber. At least one of the fuel injection ports is aimed at an impingement point on ignition device 30. In the illustrated embodiment, fuel injection valve 20 is aligned with the centerline of combustion chamber recess 13 and preferably includes between four and twelve fuel injection ports with the outline of fuel sprays 22 from such injection ports depicted in FIG. 1 by dashed lines. One of the fuel injection ports is aimed to direct ignition fuel spray 22a at an impingement point on ignition device 30.

With reference to the enlarged and more detailed view of FIG. 2, ignition device 30 includes igniter 32 and sleeve 34, which is disposed around igniter 32 to provide a shielded space between igniter 32 and the inner surface of sleeve 34. In the illustrated embodiment, the shielded space includes an annular space between igniter 32 and the interior wall of sleeve 34 and the space between the free end of igniter 32 and the dome-shaped closed end of sleeve 34. A dome-shaped end is preferred compared to a square or flat end because a domed-shape provides better structural strength, while reducing the extent to which ignition device 30 protrudes into the combustion chamber. Reference number 33 identifies the shielded space in FIG. 2. The impingement point is a point on the outer surface of sleeve 34 that is proximate to at least one intake opening 36 provided through sleeve 34. Intake opening 36 and discharge opening 38 allow fluid communication between shielded space 33 and the combustion chamber. In the embodiment illustrated in FIG. 2 there are two intake openings 36. The open area and the position of intake opening(s) 36 relative to the impingement point are designed to allow an amount of gaseous fuel to enter shielded space 33 that is sufficient to ignite and cause ignition of substantially all of the gaseous fuel in the combustion chamber. Experiments have shown that the illustrated arrangement with two intake openings 36, each with a diameter of between 0.8 and 1.2 millimeters, can be effective. Experiments using a hole diameter of 0.55 millimeter for each of two intake and two discharge openings was tried, and the engine was operable but the ignition device was less effective. It is expected that the effectiveness of the smaller holes can be improved by increasing the number of openings. Early experimental results showed that a spacing of 3 millimeters between the centerline of two 1.2 millimeter diameter intake openings yielded good combustion with low emissions of hydrocarbons and NOx. More recent test results have shown that for two 1.2 millimeter diameter intake openings, good combustion and low emissions can be achieved with a center to center hole spacing that is between 2 and 3 millimeters, with the impingement point centered between the intake openings. Computational fluid dynamic analysis can be used to further study intake opening size, position and number. It is presently understood that sizing intake opening 36 too small will not allow a sufficient quantity of fuel to enter shielded space 33, whereas sizing the intake opening too large can lead to excessive flow between shielded space 33 and the combustion chamber, and consequences of this can include excessive cooling of igniter 32, too rich a fuel mixture and reduced pressure build up within shielded space 33, causing slower or less extensive penetration of the burning fuel-air mixture that is propelled into the combustion chamber.

With some piston bowl designs, such as ones that employ a pip, depending upon how far ignition device 30 protrudes into the combustion chamber, a dimple can be formed in the piston bowl opposite ignition device 30 to prevent contact therebetween during engine operation.

For the sleeve design shown in FIG. 2, which employs 4 holes (36 and 38), performance was measured with the end of the igniter at various positions within shielded space 33, relative to intake openings 36. Better combustion results were achieved when the end of igniter 32 was within 3 millimeters of the centerline of intake openings 36, and the best results were achieved when the end of igniter 32 was positioned within 1 millimeter of the centerline of intake opening 36 or level with the centerline of intake opening 36, as shown in FIG. 2.

FIG. 3 is a plan view of a cylinder head viewed from within the combustion chamber as if the piston were removed. FIG. 4 is a side view of an example of a combustion chamber that can be paired with the plan view of FIG. 3, viewed along the section line shown in FIG. 3. In this embodiment, elements that correspond to similar elements to those in FIGS. 1 and 2 are indicated by reference numbers increased by an increment of 100. For simplicity, the intake and exhaust valves are not shown, but with the positioning of injection valve 120 and ignition device 130 in the central region of the cylinder head area, two, three, and four valve designs can be accommodated.

Fuel injection valve 120 includes nozzle 121 with fuel injection ports 124. Fuel injection port 124A is oriented to direct an ignition fuel spray towards ignition device 130, which is inclined towards nozzle 121. The position of ignition device 130 in cylinder head 114 is chosen so that the ignition fuel spray introduced through fuel injection port 124A possesses a free spray length of between 3 millimeters and 8 millimeters, or 5% to 10% of the diameter of the combustion chamber recess depending upon the size of the combustion chamber. As shown in FIGS. 3 and 4 to facilitate the alignment of ignition fuel spray 122A with ignition device 130, it is advantageous for the centerline of ignition device 130 to intersect with the centerline of injection valve 120, but these centerlines need not intersect as long as the orientation of fuel injection port 124A is oriented to direct ignition fuel spray 122A to the desired impingement point. The amount of fuel introduced into the engine depends upon operating conditions such as load, and whether the load is static or dynamic (that is, changing). Experimental results have shown that, under expected conditions, the above-stated spacing between the fuel injection port and the impingement point results in a sufficient quantity of gaseous fuel entering shielded space 133 to form a combustible fuel-air mixture that comes into contact with the igniter. A "sufficient quantity of gaseous fuel" is defined herein as a quantity of fuel that results in the formation of a combustible mixture within the shielded space that is ignitable to produce a burning fuel-air mixture capable of exiting the shielded space and igniting a combustible fuel-air mixture within a region surrounding fuel injection valve nozzle 121. With reference to FIG. 4, hatched region 110 is the region that surrounds fuel injection valve nozzle 121 towards which the burning combustible fuel-air mixture is directed. That is, discharge openings 138 are oriented so that the burning combustible fuel-air mixture propelled from shielded space 133 ignites the fuel in region 110.

As shown in FIG. 4, fuel injection valve 120 and ignition device 130 are mounted in cylinder head 114 and protrude therefrom. Igniter 132 is shown disposed within sleeve 134 of ignition device 130.

Axes 122 illustrate the direction that fuel sprays are introduced into the combustion chamber through fuel injection ports 124, demonstrating by way of example, a suitable injection angle for the depicted combustion chamber geometry. As is well known to those skilled in the technology, gaseous fuel that is introduced into a combustion chamber in this manner disperses from axes 122 with more dispersion occurring as the fuel travels further from nozzle 121. Axes 122 are intended to show only the injection angle of the central axes of the fuel sprays. Fuel injection ports 124 can be oriented to provide an injection angle of between 10 and 25 degrees, which is selected to provide uniform distribution of the gaseous fuel within the combustion chamber, with the selected injection angle being dependent upon an engine's combustion chamber geometry. The selected injection angle is chosen to optimize fuel spray length while aiming the fuel sprays at turbulent regions within the combustion chamber. For improved fuel distribution, longer fuel spray lengths are generally preferred.

FIG. 4A is an enlarged view of nozzle 121 and ignition device 130, absent axes 122 shown in FIG. 4, to provide an unobscured view of ignition fuel spray 122A. Ignition fuel spray 122A can have a different injection angle compared to the other fuel sprays. The fuel injection port through which the ignition fuel spray is introduced can also be positioned at a lower level on nozzle 121 compared to the other fuel injection ports. The injection angle of ignition fuel spray 122A is determined by the angle required to orient the direction of ignition fuel spray 122A so that ignition fuel spray 122A is directed towards an impingement point on the surface of the sleeve so that a substantial portion of the ignition fuel spray flows in a spray direction that is less than or equal to 25 degrees from an axis perpendicular to the plane that is tangential to the sleeve at the impingement point. For the purposes described herein, a "substantial portion" of the ignition fuel spray is defined as flowing in a spray direction that is oriented less than or equal to 25 degrees from an axis perpendicular to a plane that is tangential to the sleeve at the impingement point, when, during engine operation, each injection event causes an amount of fuel from the ignition spray to enter the shielded space that is sufficient to form a combustible mixture that is ignitable to propel a burning fuel-air mixture into the combustion chamber where it ignites a combustible mixture within a region surrounding the fuel injection valve.

In order to introduce the gaseous fuel directly into the combustion chamber near top dead center, the gaseous fuel is supplied to fuel injection valve 120 at high pressure. For example, gaseous fuel can be supplied with a pressure of between 200 and 300 bar, which results in the gaseous fuel being injected into the combustion chamber at high velocity. Ignition of the gaseous fuel is improved by reducing the velocity of the fuel that is brought into contact with the igniter. When the gaseous fuel is directed towards sleeve 134 so that the fuel is flowing in a direction that is perpendicular to the surface of sleeve 134 when it hits the surface, the change in momentum caused by the fuel striking the sleeve surface is maximized whereby the reduction in fuel velocity is also maximized. Accordingly, in the most preferred embodiment the ignition fuel spray is oriented so that a substantial portion of the fuel is flowing in a direction that is perpendicular to the plane that is tangential to the surface of the sleeve at the impingement point (as shown in FIG. 4A). However, in some cases, constraints imposed by an engine's combustion chamber geometry or cylinder head design can dictate a less preferred orientation for the ignition fuel spray, and experiments have shown that orientations where the ignition fuel spray direction is less than or equal to 25 degrees from a perpendicular alignment have also yielded suitable working embodiments, though less preferred.

With reference to FIG. 4A, it is believed that ignition fuel spray 122A entrains some air as it travels towards the impingement point, but that it also mixes with air that has flowed into shielded space 133 during the engine piston's intake and compression stroke. It is also believed that directing ignition fuel spray 122A towards an impingement point, rather than being aimed directly at intake opening 136 results in improved mixing and reduced cooling effects.

When a combustible fuel-air mixture forms within shielded space 133, it contacts the hot surface of the igniter, and is ignited. The pressure within shielded space 133 increases rapidly as a result of combustion and the restricted flow between the shielded space 133 and the combustion chamber. This elevated pressure propels a burning fuel-air mixture into the combustion chamber through at least one discharge opening 138. In the illustrated embodiments, there are two discharge openings 38 and 138, in FIGS. 2 and 4A respectively, with only one half of the sleeve being shown in FIG. 4A.

The discharge openings are spaced apart from the intake openings so that the discharge openings can be oriented to aim the burning fuel-air mixture to region 110 of the combustion chamber for efficient burning of the combustible fuel-air mixture that forms as a result of an injection event. The discharge openings are spaced further from the impingement point than the intake openings. Under preferred operating conditions, an injection event continues while the burning fuel-air mixture emerges from shielded space 33, 133, and it is believed that the spacing of the discharge openings from the impingement point reduces interference between the burning fuel-air mixture that emerges from ignition device 30, 130 and ignition fuel spray 22a, 122A that is directed towards the impingement point on ignition device 30, 130. Reducing such interference can help to produce a very short ignition lag, which has a positive effect on the operating characteristics of the internal combustion engine. Compared to liquid fuels, depending upon fuel pressures and fuel injection valve design, to inject the same amount of fuel on an energy basis, a fuel injection event with a longer duration can be required to inject a gaseous fuel because of its lower density. Accordingly, the arrangement of the intake and discharge openings in relation to the impingement point is important because fuel injection valve 20, 120 can continue to inject gaseous fuel into the combustion chamber after combustion is initiated because the ignition fuel spray does not interfere significantly with the spread of the burning fuel-air mixture propelled through the discharge openings. A longer duration for a fuel injection event can be advantageous in some preferred embodiments, because then the burning fuel-air mixture can be aimed at region 110 that surrounds fuel injection valve nozzle 121 where the fuel sprays that are being simultaneously injected into the combustion chamber. In such embodiments, when a single fuel injection event is employed in an engine cycle, the fuel mass flow rate can be controlled so that the ignition lag can be shorter than the time duration of the corresponding injection event.

As shown in the illustrated embodiments, the discharge openings are positioned below the intake openings. In the illustrated embodiments, the impingement point is preferably equidistant from the intake openings and could be the mid-point between them or another location along the center axis of ignition device 30, 130 that is closer to the intake openings than to the discharge openings.

Figure 5:
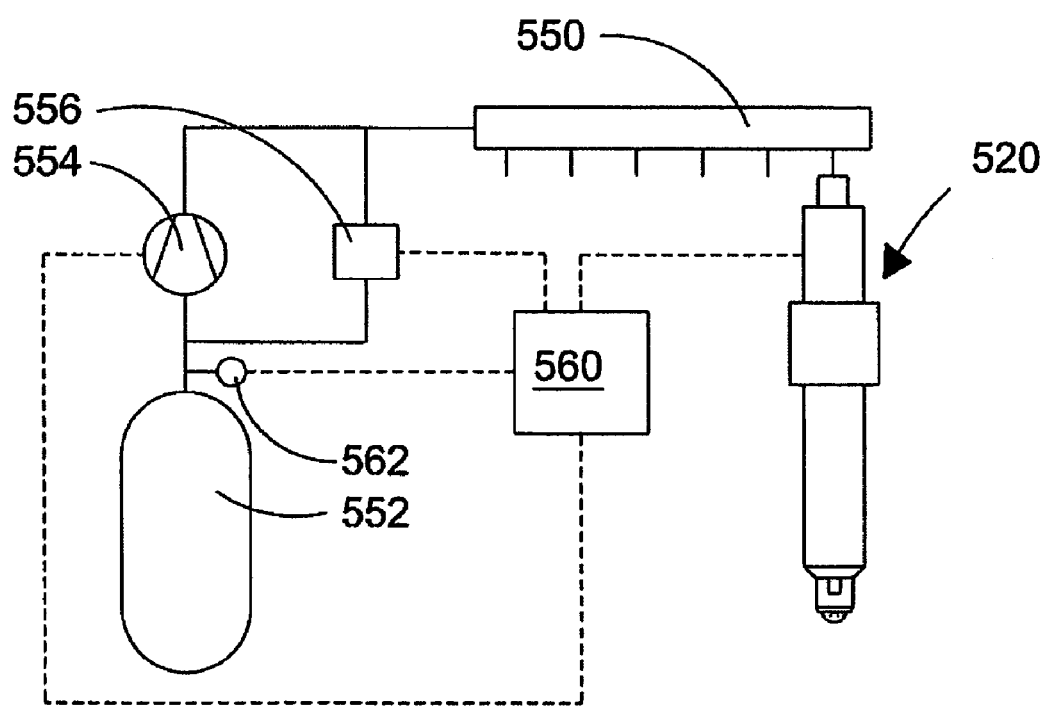
FIG. 5 is an overall schematic diagram of the fuel supply system associated with the gaseous fuel injection valve, and the controller for the fuel supply system and the fuel injection valves.

The method of operating an internal combustion engine with gaseous fuel being directly injected into the combustion chamber requires a constant high fuel pressure upstream of the gaseous fuel injection valve. If the engine is to be used in a vehicle, it is necessary or desirable to provide an on-board high-pressure fuel supply system. FIG. 5 shows one embodiment of such a fuel system with devices for supplying a gaseous fuel at high-pressure and an electronic controller for commanding operation of gaseous fuel injection valve 520.

With reference to FIG. 5, a schematic view of a gaseous fuel supply system is shown. Fuel injection valve 520 can be "directly" actuated by a piezoelectric or magnetostrictive actuator that provides the motive force for displacing a valve member to open and close the fuel injection valve. In a directly actuated fuel injection valve, the commanded movement of an actuator causes a corresponding movement of a valve member to open or close the fuel injection valve to start or end an injection event, respectively. Such actuators can be commanded to open to intermediate points between the closed and fully open positions with speed and precision to control the mass flow rate during an injection event and to allow more than one injection event during each combustion cycle. That is, piezoelectric and magnetostrictive actuators can be controlled to enable "rate shaping" which means that the degree of displacement caused by the actuator during an injection pulse can be controlled to adjust flow rate through the fuel injection valve during a fuel injection pulse.

In the schematic view of FIG. 5, the main components of a gaseous fuel supply system are shown. Common rail 550 is a header pipe that delivers high-pressure gaseous fuel to a plurality of fuel injection valves. In a multi-cylinder internal combustion engine, a gaseous fuel injection valve is provided for each combustion chamber for injecting gaseous fuel directly into each combustion chamber. To simplify the schematic view of FIG. 5, only one fuel injection valve 520 is shown.

With regard to the fuel supply system, and continuing with the example of a multi-cylinder engine as suggested in FIG. 5, gaseous fuel injection valve 520 is supplied with a gaseous fuel pressure of between 200 and 300 bar through common rail 550 that supplies high-pressure fuel to each one of the gaseous fuel injection valves. The gaseous fuel is stored in fuel storage tank 552 and supplied to the fuel supply system at a pressure corresponding to the amount of gaseous fuel remaining therein. When fuel storage tank 552 is filled to maximum capacity, the pressure of the fuel delivered to the fuel supply system will be high, and as the tank is emptied, pressure within fuel storage tank 552 decreases. If gaseous fuel storage tank 552 is fully charged, for example, with a pressure of between 200 and 300 bar, then controller 560 determines this from pressure transducer 562 and controller 560 considers engine operating conditions when controlling compressor 554 and pressure control device 556 to supply the proper amount of gaseous fuel to the injection valves at the desired pressure. As more gaseous fuel is removed, and the pressure is correspondingly lower, as detected by pressure transducer 562, and controller 560 takes this into account when controlling compressor 554 and pressure control device 556.

The illustrated fuel injection valves have a nozzle with orifices, which is the type of nozzle that is generally employed with an inward opening needle. Those skilled in the technology will understand that an outward opening needle is also suitable, and in either case, the nozzle of the fuel injection valve is preferably provided with features for directing fuel sprays into the combustion chamber and aiming one of the fuel sprays towards an impingement point on the ignition device.

Other fuel supply systems can be employed with fuel injection valve 560 to practice the present method. For example, a liquefied gaseous fuel supply system comprising a cryogenic storage tank, a fuel pump, a vaporizer, and associated pressure control devices could be substituted for the compressed gaseous fuel supply system shown in FIG. 5.

Figure 6A:
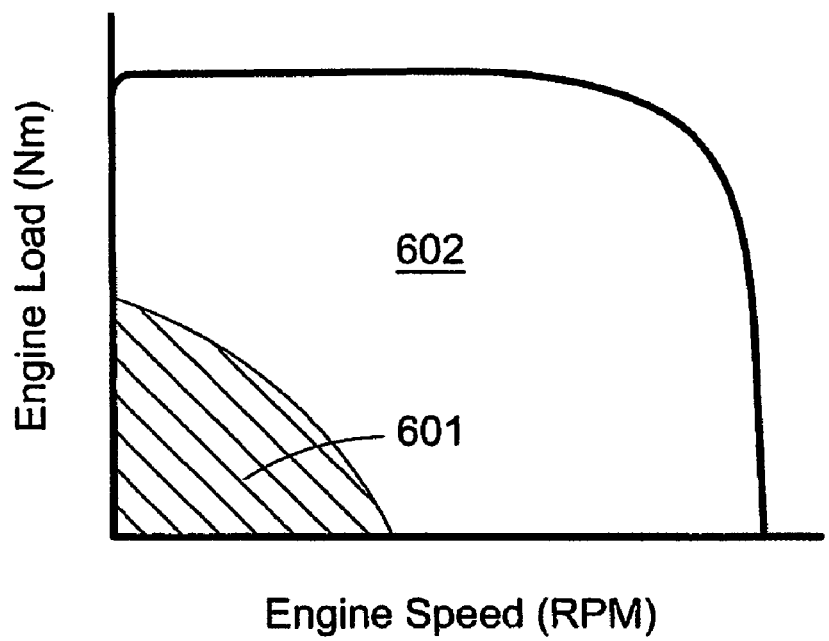
FIGS. 6A and 6B are graphs which show engine load plotted against engine speed, which defines regions where different operating modes are selected according to the present method.
Figure 6B:
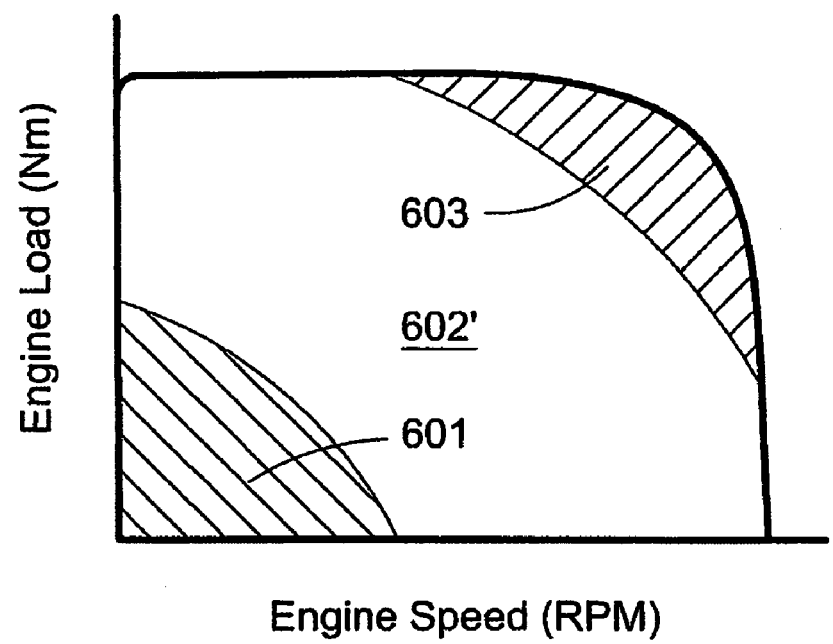

FIGS. 6A and 6B are graphs which show engine load plotted against engine speed. In FIG. 6A, the engine's operating range defined by this plot is divided into two regions. Region 601 defines a low speed and low load operating range and region 602 defines an operating range corresponding to greater engine loads and/or engine speeds. According to the present method, when the engine is operating in region 601 a first operating mode is selected, and the fuel injection valve is commanded to open to a constant amplitude for the duration of each fuel injection event, resulting in a square or rectangular shape for the command pulse, such as the command pulse shown in FIG. 7A. When the engine is operating in region 602, a second operating mode is selected, and the fuel injection valve is commanded to open to a constant amplitude for a predetermined time and then the fuel injection valve is commanded to open to a greater amplitude before being commanded to close to thereby end the fuel injection event. In this second operating mode, a single continuous fuel injection event is employed for each combustion cycle, and examples of the shape for this commanded pulse are shown in FIG. 7B.

FIG. 6B shows the same method but further includes a third operating mode which is selected when the engine is commanded to operate within third region 603, which is distinct from the second region. Third region 603 is defined by operating conditions at which the engine speed and/or engine load is greater than the same parameters in the second region. In the third operating mode the fuel injection valve is commanded to introduce the gaseous fuel in two separate injection events for each combustion cycle. The fuel injection valve can be commanded to open to one amplitude for a first injection event and another amplitude for a second injection event. The amplitude of the first and second injection event can be the same or different, as shown by the solid and dashed lines in the illustrative examples of FIG. 7C. The operating mode selected for region 601 is the same for both FIGS. 6A and 6B, and the operating mode is the same for regions both 602 and 602'.

Figure 7A:
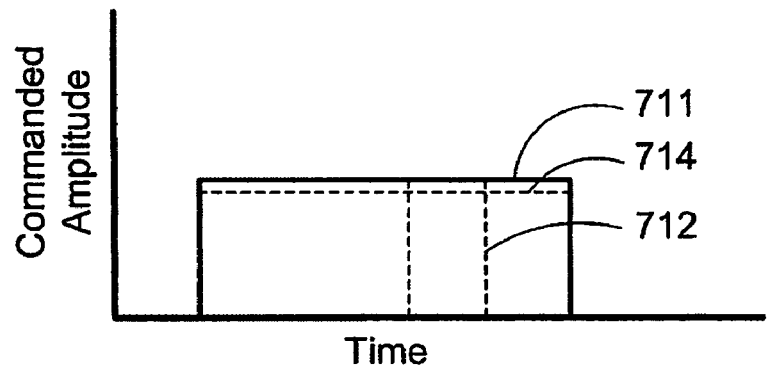
FIGS. 7A through 7C are graphs that represent a number of preferred command pulses for controlling the actuation of a fuel injection valve to control the mass flow rate under different operating modes for introduction of the gaseous fuel into the combustion chamber in a single injection event.
Figure 7B:
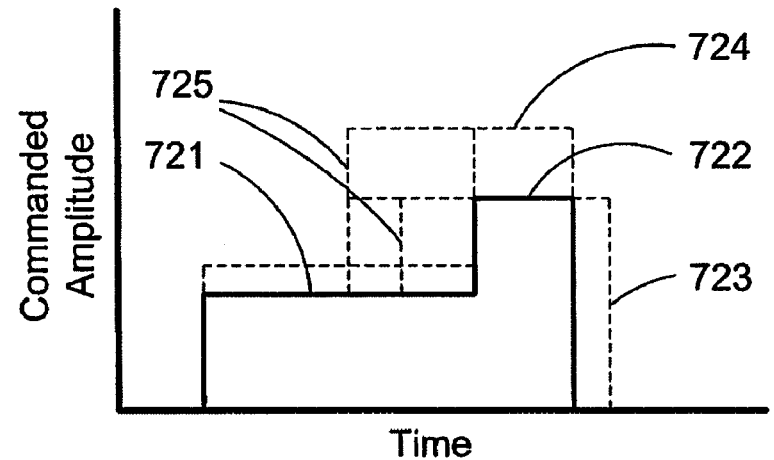
Figure 7C:
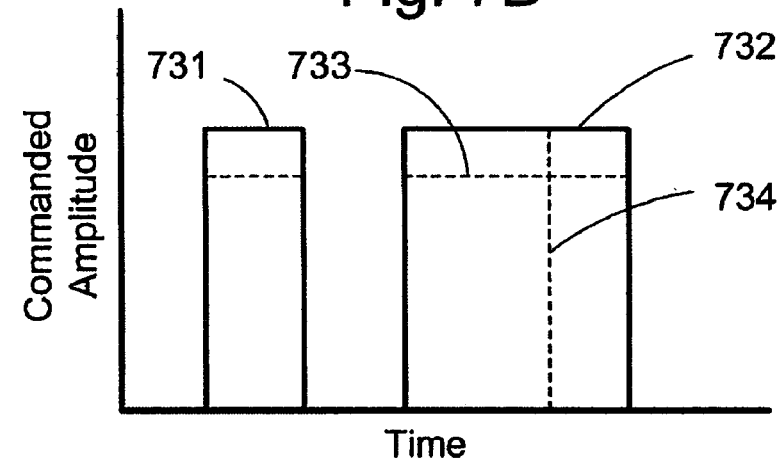

The graphs of FIGS. 7A through 7C plot the amplitude of a command pulse for controlling a fuel injection valve to introduce fuel into a combustion chamber for one combustion cycle. The amplitude that marks the vertical axis of these graphs represents different units for different types of actuators. For example, for a magnetostrictive actuator, amplitude represents electrical current directed to a coil to produce a magnetic field. In another example, for a piezoelectric actuator, amplitude represents the voltage applied to the piezoelectric elements. Movement of the valve needle correlates generally to the amplitude of the command pulses, with more fuel being introduced when a larger amplitude is commanded.

In the description of FIGS. 6A and 6B these command pulses have been described as being associated with different operating modes corresponding to different operating conditions defined by regions on an engine map that plots engine load against engine speed. Rather than employing a single fuel injection strategy across the engine map for controlling the timing and rate of fuel injection into the combustion chamber, it has been found that different strategies can be employed to achieve better overall combustion characteristics. Furthermore, within the disclosed operating regions, where a particular fuel injection strategy is employed, a number of variables associated with each of these command pulses, such as timing for start of injection, duration of the injection event, and amplitude, can be adjusted as a function of engine load and engine speed to further improve engine operation to achieve the desired results, such as reduced emissions, higher thermal efficiency, and higher combustion stability.

FIG. 7A is a graph that shows a square or rectangular command pulse. The commanded amplitude is representative of the command signal that is sent to the driver for the fuel injection valve. A line graphing the actual displacement of the valve member against time is sloped because although the movement of the valve member is very fast, it is not instantaneous. In addition, for a commanded amplitude, the actual amplitude of the valve member movement can be variable depending upon other factors such as the in-cylinder pressure, which can also influence the actual position of the valve member. FIG. 7A shows the general rectangular shape of the command pulse that the present method employs when the engine is operating under steady state conditions in region 601 and the first operating mode is selected. The engine controller can be calibrated to operate in the first operating mode with a constant commanded amplitude 711, determined by the minimum commanded amplitude that can form a combustible fuel-air mixture around the igniter for the relevant operating conditions in region 601. If the commanded amplitude 711 is held constant, the timing for starting and ending the injection event can be determined as a function of engine speed within region 601, with the time between starting and ending the injection event defining a duration that increases as engine speed increases from idle.

Dashed line 712 shows that the duration of the command pulse can be adjusted to change the duration of the injection event so that different amounts of fuel can be introduced by changing the duration of the injection event if commanded amplitude 711 is kept constant.

In another embodiment of the method, the engine controller can be calibrated to change commanded amplitude 711 to a predetermined value for each operating condition so that the commanded amplitude is the lowest value that will form a combustible fuel-air mixture around the igniter for each respective operating condition defined by the first operating mode. Dashed line 714 shows that the commanded amplitude can be changed to different predetermined values depending upon the operating condition within region 601.

For a constant engine speed, when the first operating mode is selected, the time between starting and ending the injection event can be substantially constant with the commanded amplitude increased as engine load increases, and decreased as engine load decreases. Again, by way of example, a change in the commanded amplitude is shown by dashed line 714. However, if the amplitude is increased when the engine is operating in region 601, it is possible to decrease the duration of the injection event as engine speed increases from idle.

In addition, the time for starting the command pulse of FIG. 7A can be predetermined as a function of the operating condition within region 601. Generally, when the engine is operating at or near idle, the timing for starting the injection event in the first operating mode is when the crankshaft is between 9 and 15 crank angle degrees before top dead center.

With reference now to FIG. 7B, which shows a step-shaped command pulse with a lower commanded amplitude 721 for the first step and a higher commanded amplitude 722 for the second step. The engine controller can be calibrated so that commanded amplitude 721 for the first step is the lowest amplitude that will form a combustible fuel-air mixture around the igniter for the operating conditions defined by the second operating mode; or, the commanded amplitude for the first step can be predetermined and calibrated for each operating condition to be the lowest amplitude that will form a combustible fuel-air mixture around the igniter. A dashed line above amplitude 721 of the first step indicates that the amplitude for the first step can be raised as a function of engine load and/or engine speed.

Amplitude 722 of the second step can be at or near maximum commandable amplitude of the injection valve. Dashed lines 723, 724 and 725 show that the shape of the command pulse employed for region 602, 602' can be manipulated in a number of ways to change the mass quantity of fuel that is introduced into the combustion chamber as can be predetermined as a function of the location of the operating point within region 601, 601'. Dashed line 723 shows that the duration of the injection event and the second step in particular can be extended. Dashed line 724 shows that the amplitude of the second step can be increased if it is not already at maximum commandable amplitude. Dashed lines 725 show that the timing for starting the second step can be advanced with a corresponding shortening of the duration of the first step.

The experimental results to be discussed below show that particular manipulations of the step-shaped command pulse can provide significantly better results compared to other step-shaped command pulses. The timing for starting the injection event also affects the combustion characteristics and engine performance, and a predetermined timing for starting each injection event can be assigned to each operating condition in each of the predefined operating regions. For example, within operating region 602, 602' the present method includes commanding the injection valve to begin the injection event when the crankshaft is between 11 and 36 crank angle degrees before top dead center.

Experiments with an engine operating at Mode 6 were conducted to determine the effects of changing parameters such as the timing for starting the injection event and the duration for the first and second steps. Similar experiments can be conducted for each operating condition to define the predetermined parameters that can be used to calibrate the engine controller. At Mode 6, a number of important parameters included: (i) commanding the injection event to begin when the crankshaft is between 22 and 30 crank angle degrees before top dead center; (ii) commanding a duration for the first step of between about 2.4 and about 3.7 milliseconds, and more preferably about 3.7 milliseconds; (iii) raising the commanded amplitude to the second step when the piston is after top dead center and more preferably when the crankshaft is between 2 and 15 crank angle degrees after top dead center; (iv) commanding a duration for the second step of between about 0.6 and about 1.0 milliseconds and more preferably about 0.8 milliseconds; and, (v) commanding the second step to have an amplitude that is at or near maximum commandable amplitude for the injection valve.

With reference now to FIG. 7C, which shows a command pulse that can be employed when the engine is commanded to operate within region 603, whereby the gaseous fuel is introduced into the combustion chamber in two separate injection events for each combustion cycle. For this command pulse the fuel injection valve is commanded to open to amplitude 731 for the first injection event and to amplitude 732 for the second injection event. Amplitude 731 can be greater than amplitudes 711 and 721, and in some embodiments of the method, amplitude 731 can be maximum commandable amplitude for the fuel injection valve. Amplitude 732 can be greater than or equal to amplitude 731, and in some embodiments amplitude 732 is fixed at or near maximum commandable amplitude for the fuel injection valve. In other embodiments of the method, amplitude 732 can be maximum commandable amplitude when the engine is operating at or near maximum rated power, and for a constant engine speed, the amplitude can be changed as a function of engine load, for example, as shown by dashed line 733, with lower amplitudes employed for lower engine loads. Changing amplitude 732 allows more flexibility in optimizing engine performance, for example, to reduce emissions, increase thermodynamic efficiency, or to improve combustion stability, but satisfactory results can also be achieved using a simpler control strategy that employs a constant amplitude for the second injection event that is at or near maximum commandable amplitude. With either approach, the amplitude of the second injection event is maximum commandable amplitude for the fuel injection valve when the engine is operating at or near maximum rated power.

The method can further comprise reducing the mass quantity of fuel that is introduced into the combustion chamber by reducing the duration of one of the injection events. The second injection event can have a duration of about 2 milliseconds when the engine is operating at or near maximum rated power, and this duration can be reduced to about 1.8 milliseconds when the engine is operating at less than or equal to about 75% of maximum rated power.

When the engine is operating in region 603 with the command pulse of FIG. 7C, for a constant engine load, the method can comprise changing the timing for starting the first injection event as a function of engine speed, whereby timing for starting the injection event is commanded to occur later in the combustion cycle as engine speed decreases, with the relative timing between the start of the first and second injection events remaining substantially constant. Good results were achieved when the duration of the first injection event was about 0.4 milliseconds and the time between the end of the first injection event and the beginning of the second injection event was between about 0.3 and about 0.4 milliseconds.

Because in-cylinder pressure can influence the position of the valve member that controls the mass flow rate through the fuel injection valve, the method can further comprise adjusting the commanded amplitude as a function of in-cylinder pressure whereby for an inward opening valve member the commanded amplitude is increased as in cylinder pressure decreases. While it might be counter-intuitive to reduce commanded amplitude as in-cylinder pressure increases, it is believed that for inward opening valve members, higher in-cylinder pressures assist with lifting the valve member further from the valve seat, whereby for a constant commanded amplitude, actual valve member lift increases as in-cylinder pressure increases.

Figure 8:
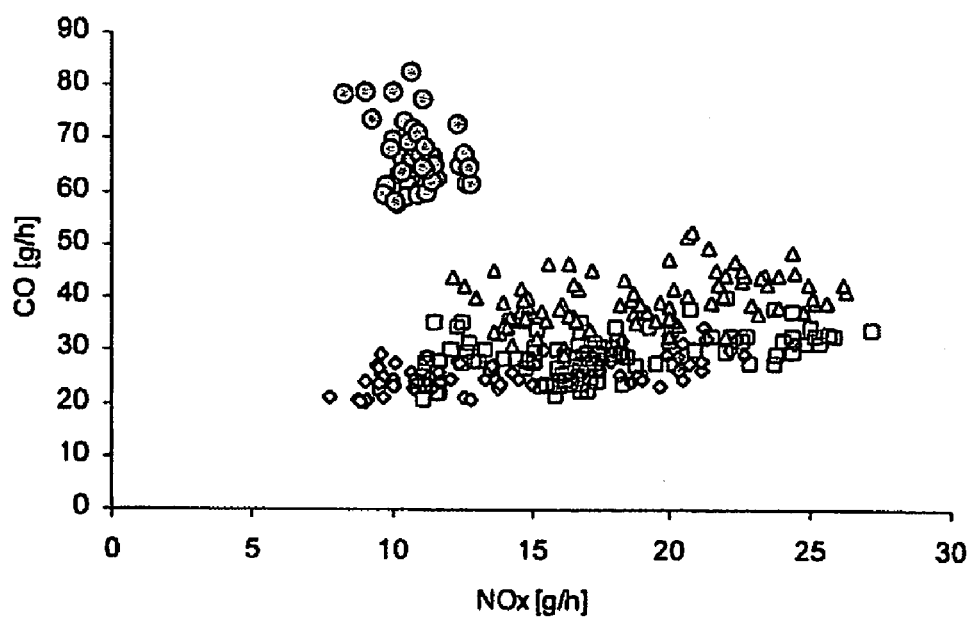
FIG. 8 is a plot of experimental data which shows the effect of changing the duration of the injection event for an engine that is operating under idle conditions.

With reference now to FIG. 8, this graph plots experimental data for measured carbon monoxide emissions versus NOx emissions for an engine operating near idle. Accordingly, the first operating mode was selected with a simple rectangular command pulse. The variables changed for this data included the duration of the injection event and the characteristics of the openings in the sleeve that surrounded the glow plug. The data points plotted as circles in the upper half of the graph correspond to results measured for injection events with a duration of 2 milliseconds. The triangles show results measured when the duration of the injection events were set at 3 milliseconds, and the squares represent results measured when the duration was set at 4 milliseconds. The diamond shapes show results measured when the duration of the injection events were set to 5 milliseconds. Changes in the characteristics of the hole openings in the sleeve are the reason for the scatter in the data points. Different sleeves around the glow plug were tested, to determine the effect of changing the spacing between the intake openings and the effect of changing the diameter of the intake and discharge holes. Spacing between the holes of 1.7 mm, 2 mm, 2.5 mm, and 3 mm were tested, and it was found that a center-to-center spacing between 2 and 3 millimeters was effective. Hole diameters of 0.8 mm, 1 mm, 1.2 mm and 1.4 mm were tested. FIG. 8 shows that there is a clear advantage to setting a duration of between 3 to 5 milliseconds versus 2 milliseconds when the engine is at idle.

Figure 9:
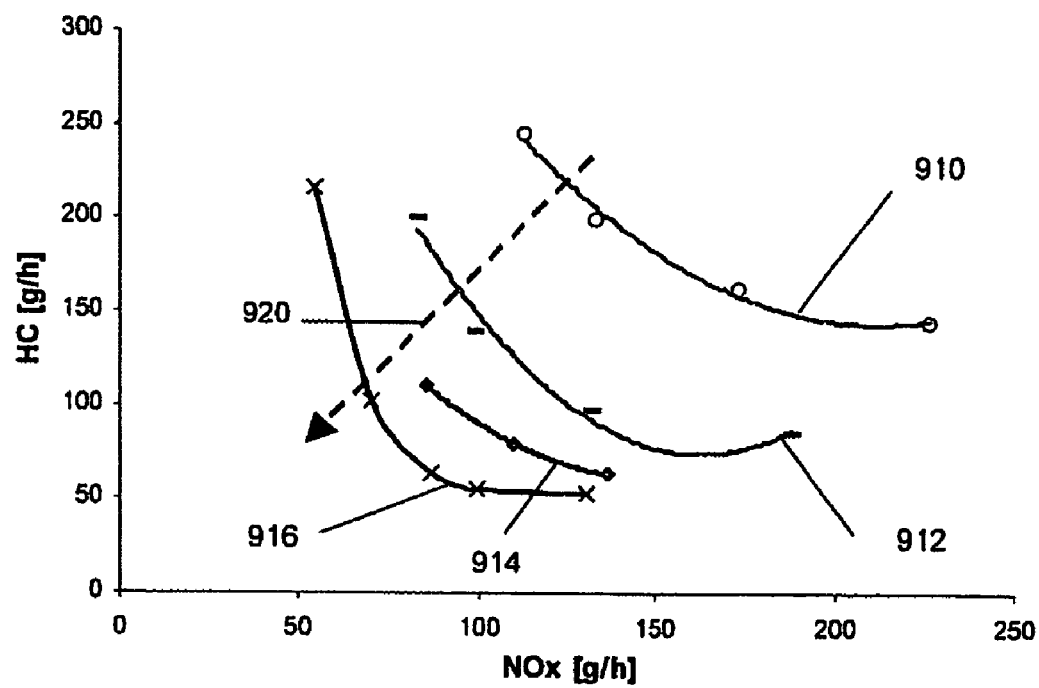
FIG. 9 is a graph that plots hydrocarbon emissions versus NOx emissions with the different lines corresponding to data collected for different commanded injection pulse shapes with the timing for the start of the injection event being varied to obtain different points along each of the plotted lines. This graph shows that the shape of the command pulse has a significant effect on the emissions of both hydrocarbons and NOx.

FIG. 9 is a graph that plots hydrocarbon emissions versus NOx emissions for data that was collected from an engine operating at Mode 6. It is desirable to reduce both of these emissions and trend line 920 shows that the shape of the command pulse can help to achieve this result. Line 910 represents the data measured with a rectangular command pulse with a duration of 3.5 milliseconds. Different points along line 910 correspond to measurements for command pulses with different timing for the start of injection. The left side of the line, where higher hydrocarbon emissions were recorded corresponds to when the start of injection occurred later in the combustion cycle, and higher NOx emissions (on the right side of the line) were measured when the start of injection occurred earlier in the combustion cycle. As shown by lines 912, 914, and 916, similar effects relating to the timing for start of injection were observed for the command pulse shapes.

Lines 912, 914 and 916 all come from step shaped command pulses in the general shape that is shown in FIG. 7B, but the significantly different results show that changes in the characteristics of the step shape can have a sizable effect on engine emissions. For line 912, the duration of the first step was 2.7 milliseconds, and for line 914, the duration of the first step was 3.2 milliseconds, and for line 916 the duration of the first step was 3.7 milliseconds. The amplitude of the first step was progressively decreased from line 912 through to line 916. For each of these lines, the amplitude of the second step was adjusted to maintain load and the duration of the second step in each case was 0.8 milliseconds. Trend line 920 shows that at Mode 6, a command pulse shape with a longer first step with a lower amplitude produces lower emissions than a command pulse shape with a relatively shorter duration and higher amplitude.

Figure 10:
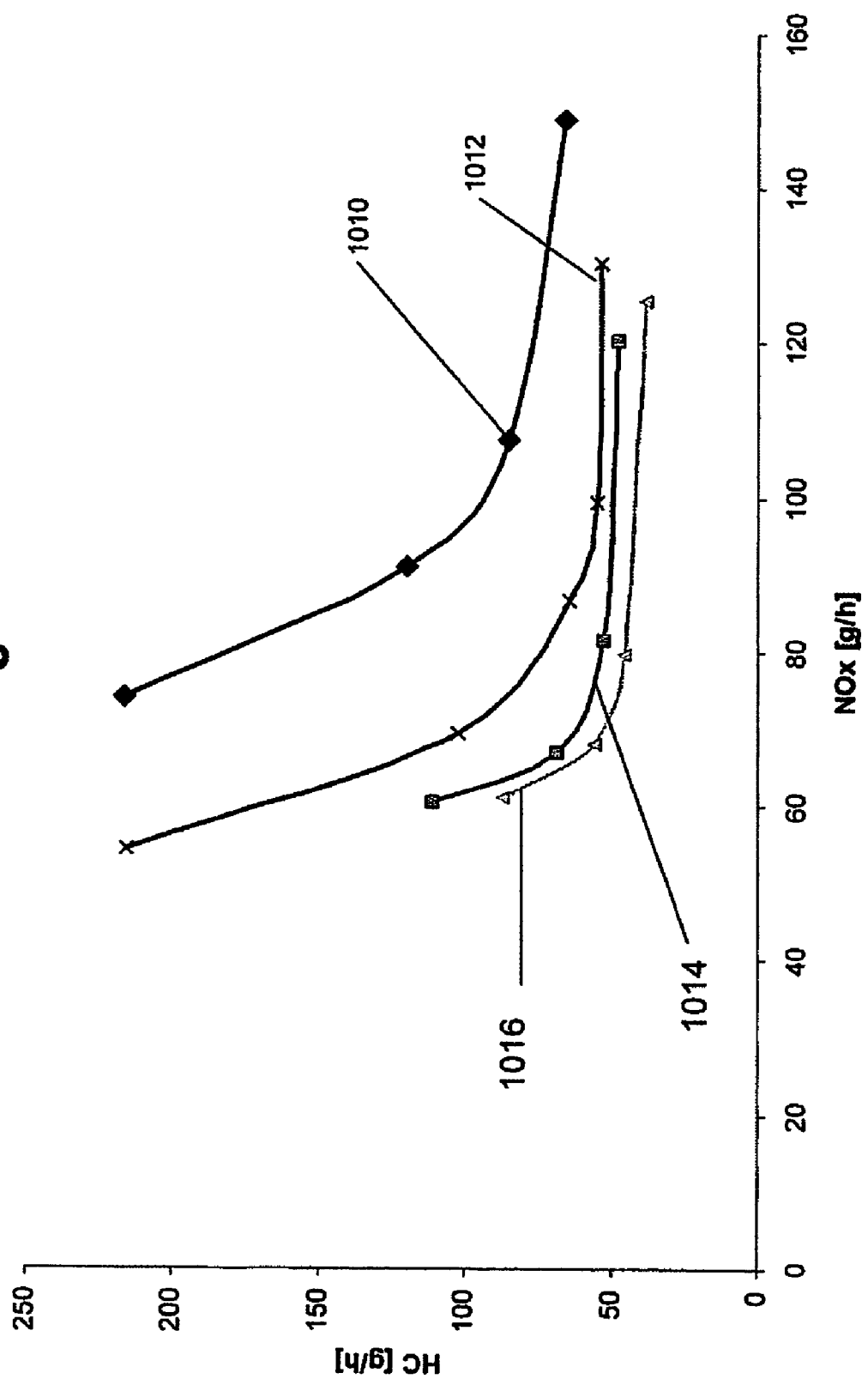
FIG. 10 is another graph that plots hydrocarbon emissions versus NOx emissions, but in this example the same shape for the command pulse is employed for each data set. Again the different points along the plotted lines show the effect of changing the timing for starting each injection event. The different lines correspond to changes in boost pressure. This graph shows that lowering boost pressure can yield lower emissions.

FIG. 10 is another graph that plots hydrocarbon emissions versus NOx emissions, with the data points collected from tests with an engine operating at Mode 6, with the command pulse having a stepped shape such as that shown in FIG. 7B. In this example the same shape for the command pulse is employed for each data set. The duration of the first step was 3.7 milliseconds and the duration for the second step was 0.8 milliseconds. Again the different points along the plotted lines show the effect of changing the timing for starting each injection event. The different lines come from data points produced as a result of changes in boost pressure. Line 1010 corresponds to data points measured when the boost pressure was 120 kPag. For the tested engine, at Mode 6, 120 kPag was maximum boost pressure. For line 1012 the boost pressure was limited to 95 kpag. Better results, in terms of reduced emissions of hydrocarbons and NOx, were achieved when the boost pressure was limited to 65 kPag (line 1014) and better still when boost pressure was limited to 45 kPag (line 1016). Again a trend was observed to show that emissions can be reduced by reducing boost pressure. An effect of increasing boost is more oxygen being introduced into the combustion chamber and this is normally thought to be beneficial and helpful to improving combustion stability. In the mid-load range defined by region 602', with the direct injection of gaseous fuel into the combustion chamber there is ample oxygen present in the combustion chamber and this makes it possible to reduce boost pressure. Accordingly, FIG. 10 shows that when the second operating mode is selected, at Mode 6, to reduce emissions of hydrocarbons and NOx it can be advantageous to limit boost pressure to less than 65 kPag.

In the tested engine, at Mode 6, a boost pressure of 120 kPag corresponded to an air-fuel ratio (lambda) of 3.7 and a boost pressure of 65 kPag corresponded to an air-fuel ratio of 2.7. Accordingly, at Mode 6 to reduce emissions of hydrocarbons and NOx it is desirable to operate with an air-fuel ratio that is less than 2.7. Under greater load and speed conditions when the engine is operating in the third operating mode, corresponding to region 603 of FIG. 6B, to increase power and efficiency with good combustion stability the method can further comprise commanding a boost pressure in the air intake system for the engine so that the air-fuel ratio is between about 1.4 and about 1.5, and preferably about 1.5.

Figure 12:
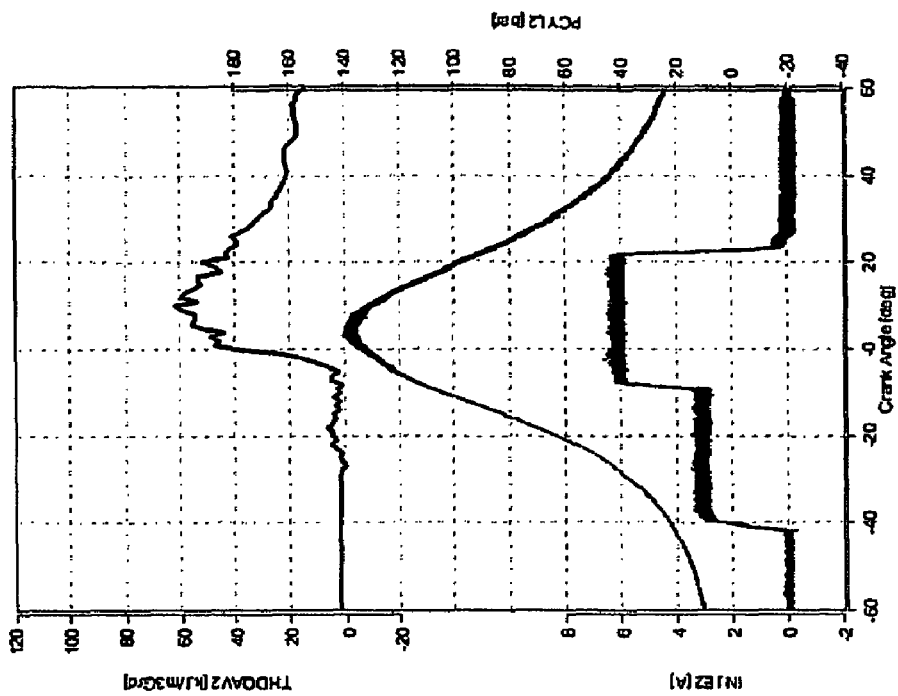
FIG. 12 is a graph that combines plots of the commanded shape for the fuel injection pulse, the heat release rate, and the in-cylinder pressure, all plotted against crank angle degrees for fuel that is injected in a continuous stepped injection pulse.
Figure 11:
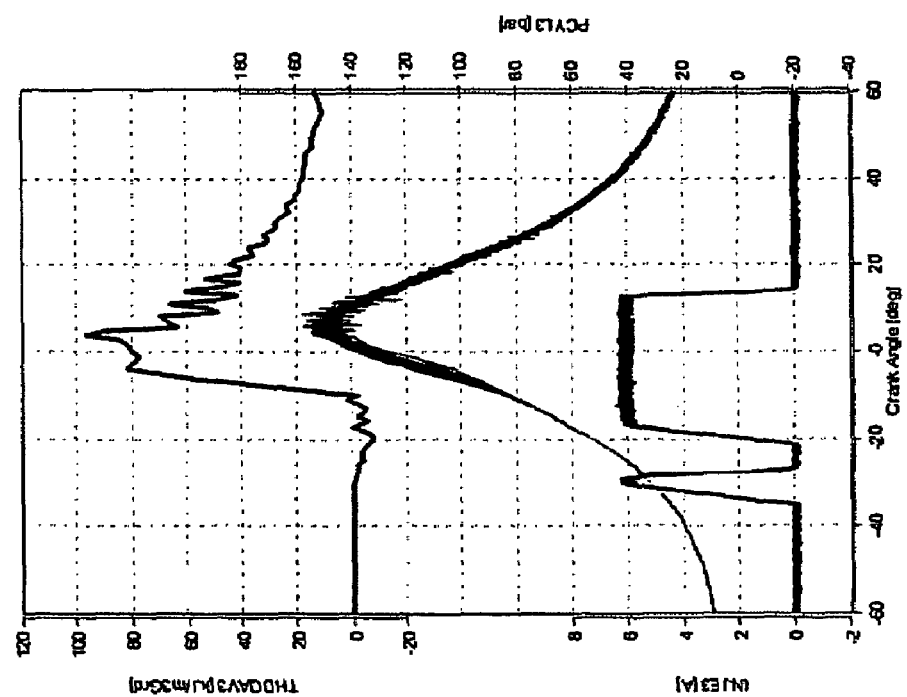
FIG. 11 is a graph that combines plots of the commanded shape for the fuel injection pulse, the heat release rate, and the in-cylinder pressure, all plotted against crank angle degrees for fuel that is injected in two separate injection pulses.

FIGS. 11 and 12 are shown side by side because they compare the results of a double pulse injection strategy versus a stepped injection strategy. The graphs combine plots of the commanded shape for the fuel injection pulse, the heat release rate, and the in-cylinder pressure, all plotted against crank angle degrees. In FIGS. 11 and 12 a similar amount of fuel is introduced in each case, with the engine operating at a speed of 2700 RPM. With the double pulse strategy of FIG. 11 the engine produced 120 kW with a thermodynamic efficiency of 32%. With the stepped injection strategy of FIG. 12 the engine produced 98 kW with a thermodynamic efficiency of 27%. Overall, better results were achieved with the double pulse strategy with 50% of the fuel being burned at 15.5 crank angle degrees after top dead center, compared to about 23.1 crank angle degrees after top dead center for the stepped injection strategy. For these two strategies the combustion stability was good and about the same, with COV IMEP being about 1.9% for the double pulse strategy and about 1.6% for the stepped injection strategy, where "COV" means coefficient of variation, and COV IMEP is calculated by taking the standard deviation of IMEP and dividing it by the average IMEP. Accordingly, the results of these tests show that it can be advantageous to employ a strategy that divides the engine's operating range into three regions, as shown in FIG. 6B, with a double pulse injection strategy commanded when the engine is operating in region 603.

While particular elements and embodiments of the present invention have been shown and described, it will be understood, of course, that the invention is not limited thereto since modifications can be made by those skilled in the art without departing from the scope of the present disclosure, particularly in light of the foregoing teachings.

What is claimed is:

1. An internal combustion engine fueled with a combustible gaseous fuel, said engine comprising:
    at least one combustion chamber defined by a cylinder, a piston reciprocable within said cylinder, and a cylinder head that covers an end of said cylinder;
    an ignition device with an end disposed within said combustion chamber, said ignition device comprising an igniter that is heatable to provide a hot surface and a sleeve surrounding said igniter, said sleeve defining a shielded space between said igniter and said sleeve;
    a fuel injection valve disposed within said combustion chamber, said fuel injection valve being operable to introduce said combustible gaseous fuel into said combustion chamber with a plurality of fuel sprays each released from one of a plurality of fuel injection ports, wherein one of said plurality of fuel injection ports is oriented to direct a fuel spray, referred to as an ignition fuel spray, towards an impingement point on a surface of said sleeve so that when said ignition fuel spray exits its respective fuel injection port a substantial portion of said ignition fuel spray is flowing in a spray direction that is oriented less than or equal to 25 degrees from an axis perpendicular to a plane that is tangential to said sleeve at said impingement point;
    at least two intake openings provided through said sleeve, each opening having a center spaced between 1 and 1.5 millimeters from said impingement point, said intake openings connecting said shielded space to said combustion chamber whereby, when said ignition fuel spray impacts said impingement point, a portion of said combustible gaseous fuel contained within said ignition fuel spray passes through said intake openings and into said shielded space;
    a discharge opening provided through said sleeve, wherein said discharge opening is oriented to direct a burning fuel-air mixture from said shielded space and towards said plurality of fuel sprays near said fuel injection valve; and
    wherein said sleeve restricts flow between said shielded space and said combustion chamber so that combustion of said combustible gaseous fuel within said shielded space produces a pressure therein that is greater than the pressure within said combustion chamber and said pressure is high enough to propel said burning fuel-air mixture into said combustion chamber and into contact with said plurality of fuel sprays.

2. A method of operating a gaseous-fueled internal combustion engine comprising at least one combustion chamber defined by a cylinder, a piston reciprocable within said cylinder, a cylinder head that covers an end of said cylinder, a piston rod connecting said piston to a crankshaft whereby said crankshaft is rotatable by reciprocal movement of said piston, a fuel injection valve with a nozzle end disposed within said combustion chamber for introducing a gaseous fuel directly into said combustion chamber, and an ignition device comprising an igniter that is heatable by an electrical heating element, said method comprising:
    selecting one of at least two predetermined operating modes as a function of engine load and engine speed, wherein a first operating mode is selected when said engine is commanded to operate within a first region corresponding to a low load and low speed range, and a second operating mode is selected when said engine is commanded to operate within a second region distinct from said first region, said second region corresponding to at least one of a greater load range and a greater speed range compared to said first region;
    in said first operating mode, introducing said gaseous fuel in a single injection event for each combustion cycle and commanding said injection valve to open with a constant amplitude A1; and
    in said second operating mode, introducing said gaseous fuel in a single injection event for each combustion cycle and commanding said injection valve to begin with a constant amplitude A2 for a predetermined time and then commanding said injection valve to open to an amplitude A3, wherein amplitude A3 is greater than amplitude A2.

3. The method of claim 2 further comprising commanding a duration for said injection event between 3 and 5 milliseconds when said first operating mode is selected.

4. The method of claim 2 wherein said amplitude A2 is the lowest amplitude that will form a combustible fuel-air mixture around said igniter for the operating conditions defined by said second operating mode.

5. The method of claim 2 wherein further comprising calibrating said amplitude A2 for each operating condition defined by said second operating mode to be the lowest amplitude that will form a combustible fuel-air mixture around said igniter.

6. The method of claim 2 wherein said amplitude A3 is at or near maximum commandable amplitude of said injection valve.

7. The method of claim 2 further comprising adjusting said amplitudes A1 and A2 as a function of in-cylinder pressure, whereby said commanded amplitude is increased as in-cylinder pressure decreases.

8. The method of claim 2 wherein when said engine is operating in said second operating mode, said method further comprising commanding said injection valve to open to said amplitude A2 when said crankshaft is between 11 and 36 crank angle degrees before top dead center.

9. The method of claim 2 wherein one of a plurality of operating conditions defined by said second operating mode is when said engine is operating at Mode 6 of the Japanese G13 emissions certification test, and said method further comprises commanding said injection valve to open to said amplitude A3 at Mode 6 when said crankshaft is between 2 and 15 crank angle degrees after top dead center.

10. The method of claim 2 wherein when said engine is commanded to operate under steady state conditions at Mode 6 and said second operating mode is selected, said method further comprises limiting boost pressure in an air intake system so that λ is less than 2.7.

11. The method of claim 2 wherein said amplitude A1 is the lowest amplitude that will form a combustible fuel-air mixture around said igniter for the operating conditions defined by said first operating mode.

12. The method of claim 11 wherein timing for starting and ending said injection event is determined as a function of engine speed, the time between starting and ending said injection event increasing as engine speed increases from idle.

13. The method of claim 2 wherein when said second operating mode is selected and said engine is operating under steady state conditions, said method further comprises limiting boost pressure in an air intake system for said engine to less than 120 kpag.

14. The method of claim 13 wherein said boost pressure is limited to less than 65 kPag.

15. The method of claim 2 wherein said amplitude A1 is predetermined for each operating condition to be the lowest amplitude that will form a combustible fuel-air mixture around said igniter for each respective operating condition defined by said first operating mode.

16. The method of claim 15 wherein for a constant engine speed, and when said first operating mode is selected, the time between starting and ending said injection event is constant and amplitude A1 is increased as engine load increases.

17. The method of claim 15 wherein timing for starting and ending said injection event is determined as a function of engine speed, the time between starting and ending said injection event decreasing as engine speed increases from idle.

18. The method of claim 17 wherein when said first operating mode is selected and said engine is operating at or near idle, said method further comprises starting said injection event when said crankshaft is between 9 and 15 crank angle degrees before top dead center.

19. The method of claim 2 wherein when one of said first or second operating modes is selected, said method further comprises controlling at least one of injection timing and commanded amplitude to:
   introduce a predetermined quantity of fuel as determined by reference to an engine map; and,
   end said injection event after start of combustion.

20. The method of claim 19, wherein for each injection event, the majority of said gaseous fuel is introduced into said combustion chamber after start of combustion.

21. The method of claim 19 further comprising controlling the timing for starting said injection event as a function of engine speed and increasing the number of crank angle degrees before top dead center for timing the start of said injection event as engine speed increases.

22. The method of claim 2 wherein said ignition device comprises a sleeve that defines an ignition chamber around said igniter and restricts communication between said combustion chamber and said ignition chamber to flow through a plurality of openings, at least some of which are oriented to face in the general direction of said nozzle of said fuel injection valve, whereby some of said gaseous fuel and oxygen from the combustion chamber can flow into said ignition chamber to form combustible mixture that is ignitable by said igniter and following ignition said sleeve permits pressure to rise within said ignition chamber so that a burning fuel-air mixture can be propelled from said ignition chamber into said combustion chamber to ignite gaseous fuel therein.

23. The method of claim 22 wherein said gaseous fuel is introduced into said combustion chamber by a plurality of fuel sprays released into said combustion chamber from said fuel injection valve, and said method further comprises directing one of said fuel sprays, referred to as an ignition spray, to an impingement point on a surface of said sleeve that surrounds said igniter so that when said ignition spray exits its respective fuel injection port a substantial portion of said gaseous fuel flows towards said impingement point in a spray direction that is oriented less than or equal to 25 degrees from an axis perpendicular to a plane that is tangential to said sleeve at said impingement point which is near at least one of said plurality of openings, whereby some of said gaseous fuel from said ignition fuel spray flows through said at least one opening and mixes with air in said ignition chamber.

24. The method of claim 23 further comprising directing said ignition spray to an impingement point that is between two of said plurality of openings, the spacing between the centers of said two openings being 2 to 3 millimeters.

25. The method of claim 2 wherein one of a plurality of operating conditions defined by said second operating mode is when said engine is operating at Mode 6 of the Japanese G13 emissions certification test, and said method further comprises commanding said injection valve to open to said amplitude A3 at Mode 6 when said piston is after top dead center.

26. The method of claim 25 wherein said method further comprises commanding said injection valve to open to said amplitude A3 for a duration of between 0.6 and 1.0 milliseconds.

27. The method of claim 21 wherein amplitude A3 is at or near maximum commandable amplitude for said injection valve.

28. The method of claim 25 wherein, when said engine is operating at Mode 6, said method further comprises commanding said injection valve to open to said amplitude A2 when said crankshaft is between 22 and 30 crank angle degrees before top dead center.

29. The method of claim 27 further comprising commanding said injection valve to open to said amplitude A2 for a duration of 3.7 milliseconds.

30. The method of claim 28 further comprising commanding said injection valve to open to said amplitude A2 for a duration of between 2.4 and 3.7 milliseconds.

31. The method of claim 30 further comprising commanding said injection valve to open from said amplitude A2 to said amplitude A3 and to close after being commanded to said amplitude A3 for 0.8 milliseconds.

32. The method of claim 1 further comprising selecting a third operating mode when said engine is commanded to operate within a third region distinct from said second region, said third region corresponding to at least one of a greater load range and a greater speed range compared to said second region, and in said third operating mode, introducing said gaseous fuel in two separate injection events for each combustion cycle, and commanding said injection valve to open to an amplitude A4 a first injection event and an amplitude A5 for a second injection event.

33. The method of claim 32 wherein when said third operating mode is selected and said engine is operating under steady state conditions, said method further comprises commanding a boost pressure in an air intake system for said engine so that λ is between 1.4 and 1.5 and more preferably 1.5.

34. The method of claim 32 wherein said amplitude A4 is greater than said amplitude A1 and said amplitude A5 is equal to or greater than said amplitude A4.

35. The method of claim 34 wherein said amplitude A4 is maximum commandable amplitude for said injection valve.

36. The method of claim 32 wherein when said third operating mode is selected, said method further comprises commanding a duration for a first injection event of 0.4 milliseconds.

37. The method of claim 36 wherein the timing between the end of said first injection event and the beginning of a second injection event is between 0.3 and 0.4 milliseconds.

38. The method of claim 32 wherein when said third operating mode is selected and said engine is operating under steady state conditions, said method further comprises commanding a boost pressure in an air intake system for said engine of between 100 and 120 kpag.

39. The method of claim 38 wherein said boost pressure is limited to less than 100 kPag.

40. The method of claim 32 wherein when said third operating mode is selected, said method further comprises controlling at least one of injection timing and commanded amplitude to:

introduce a predetermined quantity of fuel as determined by reference to an engine map; and, end said second injection event after start of combustion.

41. The method of claim 40, wherein for each combustion cycle, the majority of said gaseous fuel is introduced into said combustion chamber after start of combustion.

42. The method of claim 40 further comprises controlling the timing for starting said first injection event as a function of engine speed and increasing the number of crank angle degrees before top dead center for timing the start of said first injection event as engine speed increases.

43. The method of claim 32 wherein when said engine is operating at or near maximum rated power, said amplitude A5 is maximum commandable amplitude for said injection valve.

44. The method of claim 43 wherein when said engine is operating in said third operating mode, for a constant engine load, said method further comprises changing the timing for starting said first injection event as a function of engine speed, whereby the timing for starting said first injection event is commanded later in the combustion cycle, as engine speed decreases, the relative timing in milliseconds between the start of said first and second injection events remaining constant.

45. The method of claim 43 wherein when said engine is operating in said third operating mode, for a constant engine speed, said method further comprises changing said amplitude A5 as a function of engine load, with said amplitude A5 decreasing as engine load decreases.

46. The method of claim 45 further comprising commanding said second injection event to have a duration of 2 milliseconds when said engine is operating at or near maximum rated power and reducing said duration to 1.8 milliseconds when said engine is operating at less than or equal to 75% of maximum rated power.

* * * * *